US007976745B2

(12) United States Patent
Vecchione et al.

(10) Patent No.: US 7,976,745 B2
(45) Date of Patent: Jul. 12, 2011

(54) PROCESS FOR THE PREPARATION OF A COMPOSITE POLYMERIC MATERIAL

(75) Inventors: Raffaele Vecchione, Naples (IT); Gianfranco Carotenuto, Capua (IT); Valeria Casuscelli, Naples (IT); Floriana Esposito, San Giorgio a Cremano (IT); Salvatore Leonardi, Aci S. Antonio (IT); Luigi Nicolais, Ercolano (IT); Maria Viviana Volpe, Santa Maria Capua Vetere (IT)

(73) Assignees: STMicroelectronics S.r.l., Agrate Brianza (IT); Universita degli Studi di Napoli Federico II, Naples (IT)

( * ) Notice: Subject to any disclaimer, the term of this patent is extended or adjusted under 35 U.S.C. 154(b) by 1650 days.

(21) Appl. No.: 11/267,955

(22) Filed: Nov. 4, 2005

(65) Prior Publication Data

US 2006/0121262 A1 Jun. 8, 2006

(30) Foreign Application Priority Data

Nov. 5, 2004 (IT) .............................. MI2004A2127

(51) Int. Cl.
*C01B 31/00* (2006.01)
(52) U.S. Cl. ..................................... 264/29.7; 264/29.5
(58) Field of Classification Search ........................ None
See application file for complete search history.

(56) References Cited

U.S. PATENT DOCUMENTS

| 5,643,508 | A * | 7/1997 | Ganguly et al. | ............. | 264/29.6 |
| 7,329,700 | B2 * | 2/2008 | Carotenuto et al. | .......... | 524/394 |
| 2002/0034675 | A1 | 3/2002 | Starz et al. | ....................... | 429/42 |
| 2002/0145132 | A1 | 10/2002 | Won et al. | | |
| 2005/0197438 | A1 * | 9/2005 | Bomal et al. | .................. | 524/425 |

OTHER PUBLICATIONS

Bishop, P., "The Use of Gold Mercaptides for Decorative Precious Metal Applications," *Gold Bulletin*, 35(3):89-98, Jun. 2002.
Carotenuto, G., et al., "A Universal Method for the Synthesis of Metal and Metal Sulfide Clusters Embedded in Polymer Matrices," *J. Mater. Chem.*, 13:1-5, 2003.
Chow, G-M, et al., William Andrew Publishing, Norwich, NY, 2002, Chapter 1, "Chemical Synthesis and Processing of Nanostructured Powders and Films," pp. 3-50.
Dirix, Y., et al., "Oriented Pearl-Necklace Arrays of Metallic Nanoparticles in Polymers: A New Route Toward Polarization-Dependent Color Filters," *Adv. Matter*, 11(3):223-227, 1999.
Dirix, Y., et al., "Preparation, Structure and Properties of Uniaxially Oriented Polyethylene-Silver Nanocomposites," *J. Material Science*, 34:3859-3866, 1999.
Fragalà, M., et al., "Silver Nanoparticles Dispersed in Polyimide Thin Film Matrix," *Eur. Phys. J. D.*, 9, 631-633 pgs., 1999.

(Continued)

*Primary Examiner* — Jennifer A Chriss
*Assistant Examiner* — Camie S Thompson
(74) *Attorney, Agent, or Firm* — Lisa K. Jorgenson; Hai Han; Seed IP Law Group PLLC

(57) ABSTRACT

The present invention relates to a process for the preparation of a composite polymeric material containing nanometric inorganic inclusions comprising the steps of: mixing a polymer with a thermolytic precursor to provide a homogeneous dispersion of said at least one precursor and of said at least one polymer; subjecting said homogeneous dispersion to heating to provide a molten polymer and thermolytic fission of the precursor, generating the inclusions dispersed in the molten polymer.

56 Claims, 4 Drawing Sheets

OTHER PUBLICATIONS

Gubin, S., "Metalcontaining Nano-particles within Polymeric Matrices: Preparation, Structure, and Properties," *Colloids and Surfaces A: Physicochem. Eng. Aspects*, 202:155-163, 2002.

Gubin, S., et la., "Nanomaterial for High-Density Magnetic Data Storage," *Russian Journal of Inorganic Chemistry*, 47(Suppl. 1):S32-S67, 2002.

Gubin, S., et al., "Nanometallization of Ultradispersed Polytetrafluoroethylene," *Doklady Chemistry*, 388(4-6):44-46, 2003.

Gubin, S., et al., "Magnetic and Structural Properties of Co Nanoparticles in a Polymeric Matrix," *J. Magnetism and Magnetic Materials*, 265:234-242, 2003.

Gubin, S., et al., "Preparation, Structure, and Properties of Magnetic Materials Based on Co-Containing Nanoparticles," *Inorganic Materials*, 38(11):1085-1099, 2002.

Gudoshnikov, S., et al., "Magnetic Properties of Fe-based Nanoparticle Assembly," *J. Magnetism and Magnetic Materials*, 258-259:54-56, 2003.

Larsen, T., et al., "Solventless Synthesis of Copper Sulfide Nanorods by Thermolysis of a Single Source Thiolate-Derived Precursor," *J. Am. Chem. Soc.*, 125:5638-5639, 2003.

Liu, H., et al., "The Formation Mechanism of Cu-Pd Alloys in Mixed Aqueous Solutions by γ-irradiation," *Radiation Physics and Chemistry*, 55:357-361, 1999.

Lyons, A., et al., "Preparation of Copper-Poly(2-vinylpridine) Nanocomposites," *J. Phys. Chem.*, 95:1098-1105, 1991.

Mayer, A., et al., "Formation of Noble Metal Nanoparticles within a Polymeric Matrix: Nanoparticle Features and Overall Morphologies," Materials Science and Engineering.

Mayer, A., et al., "Palladium Nanocatalysts Protected by Polyacids," *J. App. Polymer Science*, 70:1209-1219, 1998.

Mayer, A., et al., "Poly(2-hydroxyalkyl methacrylates) as Stabilizers for Colloidal Noble Metal Nanoparticles," *Polymer* 41:1627-1631, 2000.

Mayer, A., et al., "Preparation of Silver-Latex Composites," *J. Phys. Chem. B*, 104:7278-7285, 200.

Mcfarland, A., et al., "Single Silver Nanoparticles as Real-time Optical Sensors with Zeptomole Sensitivity," *Nano Letters*, 3(8):1057-1062, 2003.

Nakamoto, M., et al. "Thermolysis of Gold(I) Thiolate Complexes Producing Novel Gold Nanoparticles Passivated by Alkyl Groups," *Chem. Commun.*, pp. 1622-1623, 2002.

Negishi, Y., et al., "Formation of $PD_n(SR)_m$ clusters (n<60) in the Reactions of $PdCl_2$ and RSH (R=n-$C_{18}H_{37}$, n-$C_{12}H_{25}$)," *Chemical Physics Letters*, 366:561-566, 2002.

Perumalsamy, P., "In-line Fiber Polarizer," Master's Thesis, Virginia Polytechnic Institute and State University, Blacksburg, Virginia, Apr. 1998, pp. i-vii, 1-47.

Porter, L., et al., "Gold and Silver Nanoparticles Functionalized by the Adsorption of Diakyl Disulfides," *Langmuir*, 14:7378-7386, 1998.

Vlachopoulos, J., et al., "An Overview of Polymer Processing," pp. 1-18, URL=http://www.polydynamics.com/Overview_of_Polymer_Processing.PDF.

Wei, G-T., et al., "Separation of Nanometer Gold Particles by Size Exclusion Chromatography," *J. Chromatography A*, 836:253-260, 1999.

Yee, C., et al., "Novel One-Phase Synthesis of Thiol-Functionalized Gold, Palladium, and Iridium, Nanoparticles Using Superhydride," *Langmuir*, 15:3486-3491, 1999.

Yurkov, G., et al., "Copper Nanoparticles in a Polyethylene Matrix," *Inorganic Materials*, 37(10):997-1001, 2001.

\* cited by examiner

PROCESS FOR THE PREPARATION OF A COMPOSITE POLYMERIC MATERIAL

BACKGROUND OF THE INVENTION

1. Field of the Invention

In its general aspect, the present invention relates to a process for the preparation of a composite polymeric material containing uniformly dispersed, nanometric inorganic inclusions.

In particular, the invention relates to a process of the aforesaid type, wherein said inclusions are obtained "in situ", i.e., they are produced in the presence of the polymer.

The invention also relates to a formed article realized in the above composite polymeric material.

Hereafter in the description and in the following claims, the words "formed article" mean any manufacture or finished plastic product such as sheets, bars, tubes, extruded objects, molded parts and similar products obtained through transformation of granules, tablets, spheroids or powders of thermoplastic polymers or of specific thermosetting resins, as it will be more apparent hereafter in the description.

2. Description of the Related Art

As it is known in various fields of the technique, the interest in high technology materials is greater and greater, such as for example composite materials able to ensure high performances.

The technological importance of a composite material lies in that it has properties that are superior, or somewhat characteristic, compared to the properties of the single components it is made of.

Among composite materials, the so-called nanocomposites, i.e., materials comprising at least two components where one is dispersed in the other in the form of nanometric particles, represent the most recent and interesting development.

Such materials enjoy, in fact, peculiar characteristics conferred by the material reduced to nanometric dimensions, and they exhibit therefore several fields of use.

The peculiar characteristics are due to a substantial change of the group of chemical-physical properties the material undergoes when it is reduced to the nanometric dimension.

The deep change is mainly due to the neat prevalence of the characteristics of the surface atoms on those of the inner atoms. Metals stay among the elements which mainly show an alteration of the properties linked to the dimension.

For example, a change has been shown in the magnetic behavior of a material in the passage to the nanometric dimension. In particular, by reducing the dimension of a ferromagnetic material, there occurs first an increase of the coercive field $H_c$ and subsequently a superparamagnetic behavior ($H_c=0$). This variation of the magnetic properties finds application, for example, in the realization of mass memories, magnetic refrigerators, magnetic sensors and transformers.

Also the optic properties of the material are strongly influenced by the nanometric dimension. Some metals such as gold, silver, copper exhibit, when reduced to the nanometric dimensions, a typical phenomenon known as plasmon effect which consists in an oscillation of the surface electrons under the action of an incident wave. This effect results in an absorption at a predetermined wavelength in the visible spectrum, which allows the use of these materials as optic filters, polarizers, optic sensors, etc.

Nanocomposite polymeric materials are of great interest, i.e., materials wherein nanometric inorganic inclusions are dispersed in a polymeric matrix. The polymers can, in fact, stabilize the nanometric phase and thus the above properties without altering them in a significant way, moreover they can improve their own performance as hereafter described.

A nanometric inorganic phase inside the polymeric matrix can increase the thermal exchange capacities or the electric susceptibility of the polymer, improve the barrier properties against gas, or even produce shielding properties against radiations, antistatic properties, having effects on the ignition temperature of the polymer. Also the mechanical and optic properties of the polymer can be changed and improved by the presence of nanometric inclusions.

From the preparation point of view, nanocomposite polymeric materials, in particular composites comprising metallic inclusions, can be obtained by means of two different processes defined "ex-situ" or "in-situ", depending on the nanoparticles being first produced and then incorporated into the polymer or obtained directly inside the polymeric matrix by using a precursor.

The processes "in-situ" in turn differentiate depending on the precursor being transformed in the desired inclusions by using chemical agents, for example with hydrogen, hydrazine, boron hydride, or through the physical means of thermolysis, photolysis or radiolysis.

A process for the preparation "ex-situ" of noble metal nanoparticles is described in U.S. Patent Application No. 2002/0034675 by Starz et al. In such document nanoparticles are described containing noble metals, alone or in combination with common metals, passivated by immersion in an aqueous solution of a polysaccharide serving as temporary stabilizer. Particles thus obtained are then used for the realization of electrodes for polymeric membrane fuel cells or as catalysts for other types of applications.

Although advantageous, the processes "ex-situ" are rather complex and limited in that the nanometric material is extremely reactive and therefore difficult to be handled. The inclusions must be synthesized and immediately passivated with an organic coating, i.e., stabilized, so as to avoid their aggregation and to favor their affinity to the polymer. These difficulties prevent the possibility of realizing nanocomposite polymers on an industrial scale relegating the practice "ex situ" to a laboratory methodology.

The processes "in situ", on the contrary, have proved to be much quicker and easier, since the nanometric inclusions are obtained, in the presence of the polymer, by a metallic precursor.

An example of process "in situ" is disclosed in U.S. Patent Application No. 2002/0145132 by Won et al. In such process, a composite polymer is obtained by irradiating, with ultraviolet light, a polymeric matrix containing a metallic precursor dispersed at the molecular level and reduced to metal by the radiant energy.

Although advantageous, the different processes "in situ" realized by the known technique are not exempt from drawbacks. For example, a problem shared by the different practices "in situ" is represented by the difficulty of obtaining particles of the same dimension, since the inclusions have a strong tendency towards aggregation.

A further limitation of the known processes "in situ" is the limited and forced choice of the polymers that can be used. These latter, so as to improve the compatibility between precursor and matrix, must contain hydrophilic groups which allow for an acceptable molecular dispersion of the precursor inside the polymeric matrix.

The use of such polymers is obviously disadvantageous, especially in consideration of some specific applications, since the presence of the hydrophilic groups gives the polymer a great capacity of absorbing water also when being used, with subsequent poor environmental stability of the polymeric product.

In the cases when it is possible to use non-polar polymers, as in the process "in situ" carried out by thermolysis, described in S. P. Gubin "Metal-containing nano-particles within polymeric matrices: preparation, structure, and properties" Colloids and surfaces A: Physicochem. Eng. Aspects 202 (2202) 155-163, there is however the difficulty of having to add the precursor in solution drop by drop to a polymer solution subjected to agitation.

Or still, as disclosed in the above document by Won et al., the precursor has to be dispersed or dissolved in a polymer solution. The solution then has to be cast on a support, for example a glass plate, so that it is distributed to form a liquid film allowing the solvent evaporation. The solid film obtained is then irradiated with ultraviolet light for decomposing the metallic precursors.

In practice, it is observed that such laborious techniques, due to the aggregation phenomena which can occur, are advantageous only for low inclusion concentrations; moreover, the need of working with polymeric solutions make them inadequate for use in a large scale, consequently preventing the production and the diffusion of manufactures in nanocomposite polymeric material which are, on the other hand, very advantageous.

There remains a need in the art for the preparation of a composite polymeric material having such characteristics as to overcome the drawbacks cited with reference to the processes provided by the prior art.

BRIEF SUMMARY OF THE INVENTION

One embodiment according to the invention provides a process for the preparation of a composite polymeric material containing uniformly dispersed, nanometric inorganic inclusions comprising the steps of:

mixing at least one polymer and at least one thermolytic precursor with obtainment of a homogeneous dispersion of said at least one polymer and of said at least one thermolytic precursor;

subjecting said homogeneous dispersion to heating with obtainment of said at least one polymer in the molten state and thermolytic fission of said at least one precursor, generating said inclusions dispersed in the molten polymer.

Preferably, the above mixing and heating steps occur simultaneously in a single thermomixing and fission step.

Alternatively, it is possible to provide that in the above mixing step the precursor is dispersed through solution in the polymer, with obtainment of the above homogeneous dispersion.

In a preferred embodiment of the invention, the above thermomixing and fission step comprises a first heating and mixing stage at a temperature lower than the fission temperature of the thermolytic precursor and a second heating and fission stage at a temperature equal or higher than the fission temperature of the thermolytic precursor.

Advantageously, the above composite polymeric material can be a formed article, for example any manufacture or finished plastic product such as sheets, bars, tubes, extruded objects, molded parts and similar products obtained through transformation of granules, tablets, spheroids or powders of such composite polymeric material.

To that end, the process further comprises a step of subjecting the above molten polymer comprising inclusions to thermoforming, with obtainment of the above formed article.

Advantageously, in case of dispersion of the precursor through solution, it is possible to provide that the above heating and thermoforming steps occur simultaneously.

Preferably, the above thermolytic precursor is an organometallic thermolytic precursor, advantageously a mercaptide or metallic thiolate of formula [Me(SR)$_n$] where Me indicates an atom of a metal, R generally indicates an organic residue, while n is an integer corresponding to the metal valency preferably between 1 and 4, inclusive.

Among the metallic mercaptides the preferred ones are those of gold, silver, copper, cobalt, palladium, platinum, nickel, cadmium, zinc, iron, rhodium, iridium, ruthenium, osmium and combinations of these ones, but the possibility of employing mercaptides of any other metal is not excluded.

Advantageously, such thermolytic precursors, due to their affinity to the polymer, can be mixed therewith also in high concentrations, in particular the concentrations are between 0.1% and 60% by weight with respect to the total weight of precursor and polymer used, preferably between 1 and 20%.

As regards the organic residue R of the mercaptide, it is chosen in relation to the metal, to the polymer and possibly to the type of thermoforming.

Advantageously, R can be any aliphatic, aryl, arylalkyl or alkylaryl residue, possibly substituted, similar and thermally compatible with the polymer used, preferably chosen from the group comprising sulphur resinate, o-methyl phenyl, m-methyl phenyl, p-methyl phenyl, phenyl, p-ter-butyl phenyl, o-methyl-p-ter-butyl phenyl, pinenyl, isopropyl, sec-butyl, 1-methylheptyl, 1-methyldodecyl, 1-methyloctadodecyl, α-methyl benzyl, α-butyl benzyl, α-undecyl benzyl, ter-dodecyl, ter-amyl, ter-octyl, ter-butyl.

In the case of simple aliphatic chains $C_mH_{2m+1}$, m is preferably comprised between 4 and 100, or even more preferably between 6 and 20. Typically, the higher the value of m, the more difficult the thermolytic precursor is to be dispersed at the molecular level in the polymer used.

Conveniently, the above thermolytic precursor is a powder precursor, while the polymer is preferably in the granular form, or also powdered.

Advantageously, the above thermoforming step of the molten polymer is carried out in any thermoforming station of the known type by means of any process step such as extrusion, injection molding, calendering, compression molding, rotomolding, powder injection molding, molding with thixotropic forming, spinning and similar thermoforming steps.

As regards the polymer used it is to be said that, advantageously, it is any thermoformable polymer, for example a thermoplastic polymer or, still advantageously, an unsaturated thermoplastic, i.e., able to reticulate through thermal or chemical effect.

In this latter case, for the obtainment of a formed article in composite polymeric material, it is to be said that advantageously the reticulation can occur during or following the above thermoforming step.

Suitable thermoformable polymers include, by way of example, polyolefins, rubbers, polystyrenes, polyacrylates, polyacrylics, polyamides, polycarbonates, polychlorinated, saturated and unsaturated polyesters, polyethers, polyfluorinated, polyketones, polyoxides, polymethacrylates, polymers containing sulphides, vinyl polimers, thermoplastic polyurethanes, polyimmides, polyarylates, polyaldehydes, cellulose, mixtures and copolymers thereof.

Advantageously, the above polymers can be used also in the expanded form, and with regular taxy, thus, not only in the atactic form but also in the isotactic or syndiotactic form.

Among the polyolefins, the preferred ones are polyethylene with low, medium and high density, polyethylene with high and ultra high molecular weight, linear polyethylene, cross-linked polyethylene, polyisobutylene, polymethylpentene, polypropylene, polybutene.

Among the rubbers, the preferred ones are polyisoprene, polybutadiene, polychloroprene, poly(ethylene-co-propylene), poly(butadiene acrylonitrile).

Among the polystyrenes, the preferred ones are polystyrene, poly(styrene-co-butadiene), poly(styrene-co-acrylonitrile), poly(styrene-co-maleic anhydride), poly(acrylonitrile-butadiene-styrene), poly(acrylonitrile-ethylene chloride-styrene), poly(acrylonitrile-ethylenepropilendiene-styrene), poly(acrylonitrile-styrene-acrylate) poly(styrene-co-methyl methacrylate).

Among the polyacrilates, the preferred ones are polyacrylate, poly(acrylonitrile-butadiene-acrylate), poli(n-butyl acrylate), polyisopropylacrylate, polyethylacrylate, polymethylacrylate.

Among the polyacrylic the preferred ones are polyacrylonitrile, poly(acrylonitrile-methylmethacrylate), polyacryl ether ketone.

Among the polyamides, the preferred ones are polyamide 6, polyamide 11, polyamide 12, polyamide 46, polyamide 66, polyamide 68, polyamide 69, polyamide 610, polyamide 612, poly(m-phenylene isophtalamide), polyphtalamide, poly(1, 4-phenyldiamine), polyacrylamide, polyarylamide, polyamidimide.

Among the polychlorinated, the preferred ones are polyvinylchloride, chlorinated polyvinylchloride, polivinyldenchloride, chlorinated polyethylene, chlorinated polypropylene, polychlorotrifluorethylene.

Among the polyesters, the preferred ones are polybutilenterephthalate, polyethylenphthalate, polycyclic exandimethylene terephthalate, polyethylenisophthalate, polyethylenterephthalate.

Among the polyethers, the preferred ones are polyetherimide, polyether ketone, polyoxymethylene, polyphenylenoxide, polyphenylether.

Among the polyfluorinated, the preferred ones are polyvinyl fluoride and polyvinylidene fluoride.

Among the polyketones, polyether ketone is the preferred one.

Among the polyoxides, the preferred ones are the ethylene polyoxide and the propylene polyoxide.

Among the polymethacrylates, the preferred ones are polybenzyl methacrylates, polybutyl methacrylate, polycyclic exyl methacrylate, polyethyl methacrylate, polyisobutyl methacrylate, polyisopropyl methacrylate, polymethyl methacrylate, polyphenyl methacrylate, poly(n-propyl methacrylate).

Among the polymers containing sulphurs, polysulphone, polyphenylensulphur, and polyether sulphone are preferred.

Among vinyl polymers, the preferred ones are polyvinyl acetate, polyvinyl butyril, polyvinyl alcohol, polyvinyl chloride acetate, polyvinylidenacetate, polyvinyl carbazole.

Among polyaldehydes, phenol formaldehyde is preferred.

Further characteristics and advantages of the process according to the present invention will be more apparent form the following description made with reference to the annexed drawings given by way of indicative and non-limiting example.

DETAILED DESCRIPTION OF THE INVENTION

The process steps hereafter described do not form a complete flow of the process for the preparation of a composite polymeric material. The present invention can be put in practice together with the techniques for the preparation of polymeric materials currently used in the field, and in the description only those process steps necessary for understanding the present invention are included.

Figure 1:
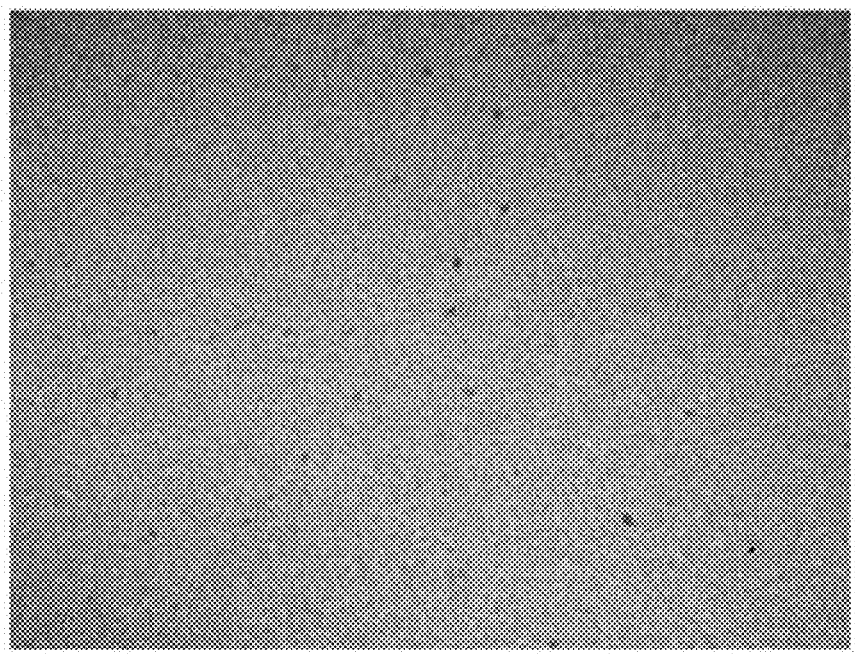
FIG. 1 shows an electronic transmission micrography of a polystyrene sample comprising silver inclusions obtained with the process according to the invention.

With reference to FIG. 1 an electronic transmission micrography is shown of a composite polymeric material sample, comprising nanometric metallic inclusions uniformly dispersed in a polymeric matrix, obtained according to the process of the present invention.

According to the invention, for obtaining a composite polymeric material as above first of all at least one polymer and at least a thermolytic precursor are mixed together with obtainment of a homogeneous dispersion of the polymer and of the precursor.

A thermolytic precursor is a substance which is activated by the temperature. In other words, the obtainment of a certain temperature value, referred herein as "fission temperature" or "decomposition temperature", has the effect of breaking a bond of the precursor molecule which, in consequence, generally splits into two portions. One of the portions obtained corresponds to the element or to other chemical species desired as inclusion.

According to the invention, the above homogeneous dispersion is then subjected to a heating step.

In such heating step, the homogeneous dispersion reaches the softening temperature of the polymer, also referred herein as "vitreous transition temperature" or "glass transition temperature" or Tg. The polymer melts while the precursors splits, through effect of the same temperature, directly into the molten polymer generating nanometric inclusions dispersed in the molten polymeric matrix.

The processing temperature generally depends on the softening temperature of the polymer used, as well as on the fission temperature of the precursor, also depending each time on the type of the precursor used.

Advantageously, the thermolytic precursor is a metallic mercaptide of formula $[Me(SR)_n]$ where Me indicates an atom of a metal, R indicates an organic residue, while n is an integer corresponding to the metal valency, preferably between 1 and 4, inclusive.

The fission temperature of such precursors is typically in the range between 100° and 250° C., therefore compatible with the thermal stability of the majority of the polymers used in the industry of the plastic materials.

Such temperature depends on the type of metal in the mercaptide and, this being equal, on the organic residue R. For example, the gold orthomethylphenylmercaptide exhibits a decomposition temperature of 215° C., almost twice as high as the decomposition temperature of gold paramethylphenylmercaptide of 135° C.

It is to be noted that the use of the above precursors, in the case of lighter noble metals, can lead to the formation of nanometric inclusions of metal sulphurs rather than of metals.

For example copper dodecanthiolate, through effect of the thermal decomposition, leads to the formation of nanoparticles of copper sulphur.

In a preferred embodiment of the process according to the invention it is possible to provide that the above steps of mixing and heating occur simultaneously in a single step of thermomixing and fission as obtained, for example, by supplying a charging hopper of an extruder with the polymer in granules and the powdered precursor.

An extruder essentially comprises a heated cylinder, inside which the polymer supplied by the hopper melts and is put forward by means of a rotary screw, for going out from one or more openings provided in a matrix of predetermined shape.

At the output of the matrix the extruded polymer is cooled below the vitreous transition temperature so as to ensure its dimensional stability.

Inside the heated cylinder the polymer melts, and, by means of the rotary screw, the precursor mixes intimately with the molten polymer with generation of the above homogeneous dispersion.

Simultaneously with the mixing there is also the thermolytic fission of the precursor with obtainment of the nanometric inclusions.

In this respect, it is to be said that, in a further preferred embodiment of the process according to the invention, the above step of thermomixing and fission can comprise a first heating and mixing stage carried out at a first temperature value and a second heating and fission step carried out at a second temperature value.

Conveniently, the first temperature value is lower than the temperature threshold at which the precursor thermolytic fission starts but higher, however, than the polymer softening temperature. In doing so, an optimal mixing is ensured between precursor and polymer, obtaining the homogeneous dispersion of the precursor in the molten polymeric matrix without causing the decomposition of the precursor.

The second heating step is carried out at a second temperature value, equal or higher than the temperature at which the precursor starts to decompose, obtaining the nanometric inclusions which, advantageously, will be uniformly dispersed in the molten polymeric matrix.

According to a further embodiment of the process according to the invention, it is possible to obtain the above homogeneous dispersion by means of a mixing step wherein the precursor is dispersed through a solution in the polymer.

According to the invention, by means of the present process, the composite polymeric material can be a formed article, for example a plastic product, both as finished and as semi-finished product, such as sheets, bars, tubes, extruded objects, molded parts and similar formed articles.

To the purpose, the process according to the invention further comprises a step of subjecting the above molten polymer comprising inclusions to thermoforming, with direct obtainment of the above formed article.

Advantageously, in the case of dispersion of the precursor through solution in the polymer, it is possible to provide that the above steps of heating and of thermoforming occur simultaneously as, for example, in the compression molding.

In such embodiment, the homogeneous dispersion of polymer and precursor is introduced in a heated mould. The heat and the pressure applied in the mould cause the melting of the polymer, the fission of the precursor and the simultaneous forming with obtainment of the above formed article realized in polymeric material comprising the nanometric inclusions.

It is to be noted that, advantageously, the process according to the invention is suitable also for the realization of a composite polymeric material, thus of a formed article realized in such material, comprising micrometric inorganic inclusions.

It is in fact observed that, the higher the processing temperature is with respect to the precursor fission temperature, and the more prolonged the temperature is maintained as such, the more favored is the growth of the inclusions which, therefore, according to the need, can be micrometric.

With reference to FIGS. 1-4, the invention is now described in greater detail through some non-limiting embodiments of the process according to the invention.

Example 1

FIG. 1 shows an electronic transmission micrography of a polystyrene sample comprising silver monodispersed nanoparticles with mean diameter of about 20 nm.

The polystyrene processed in the form of granules is an atactic polystyrene (aPS) acquired from Aldrich (mean $M_w$ ca. 230,000, mean $M_n$ ca. 140,000 and Tg=94° C.).

The thermolytic precursor used, silver dodecanthiolate $[Ag(SC_{12}H_{25})_2]$, was mixed with the polymer through a solution in an amount equal to 10% by weight with respect to the total weight of polymer and precursor, obtaining a homogeneous dispersion of polymer and precursor.

In particular, the aPS was dissolved in a chloroform solution at a concentration equal to 20% by weight with respect to the total weight. Similarly, the silver dodecanthiolate was dissolved also in chloroform at a concentration equal to 40% by weight with respect to the total weight.

The two solutions were mixed for some minutes on a plate with magnetic agitator and subsequently the entire solution was cast in Petri dishes leaving the solvent evaporate. Once dried the material was reduced into pellets.

Thus, the pellets of polymer comprising the precursor uniformly dispersed therein were heated in a Haak Rheocord 9000 mixer, at a temperature of about 180° C. for approximately 30 minutes.

Figure 2:
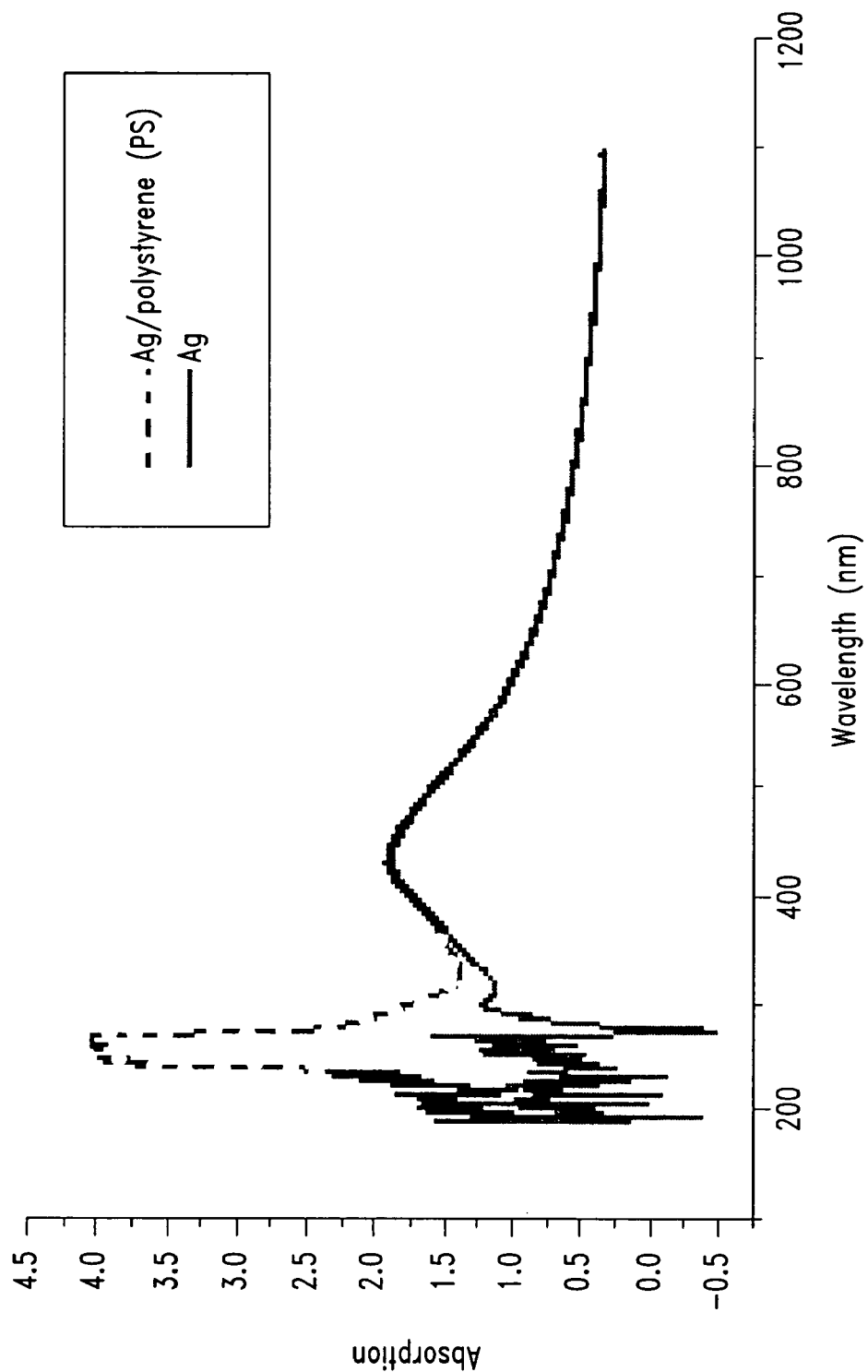
FIG. 2 shows, as a comparison, a UV spectrum of a silver sample and a UV spectrum of the sample of FIG. 1 wherein a peak of the polystyrene absorption and an absorption peak at 420 nm characteristic of the nanometric silver plasmon effect can be seen.

FIG. 2, wherein a UV spectrum of the above sample is shown in comparison with a UV spectrum of a silver sample, highlights the presence of nanometric silver particles dispersed in a polystyrene matrix.

In the figure a peak of absorption around 250 nm can be seen which can be typically ascribed to the polystyrene, and a peak characteristic of the so called plasmon effect shown by the metals reduced to nanometric dimensions, which is well differentiated from the absorption signal of the silver sample. In particular, a peak can be seen at 420 nm typical of the nanometric silver.

Example 2

Figure 3:
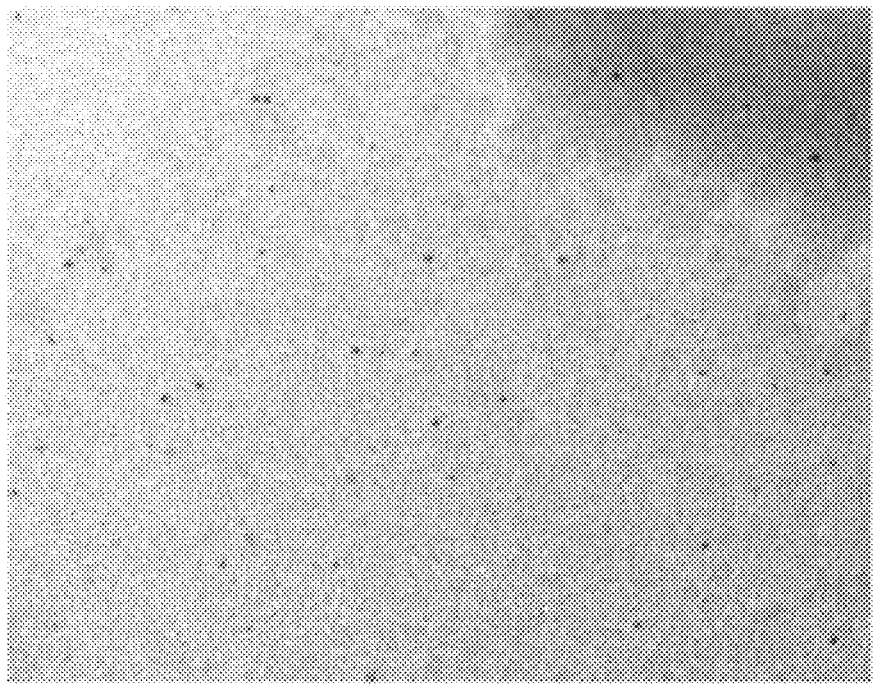
FIG. 3 shows an electronic transmission micrography of a polystyrene sample comprising cobalt inclusions obtained with the process according to the invention.

FIG. 3 shows an electronic transmission micrography of a polystyrene sample comprising cobalt monodispersed nanoparticles with mean diameter of about 5 nm.

The polystyrene processed in the form of granules is an atactic polystyrene (aPS) acquired from Aldrich (mean $M_w$ ca. 230,000, mean $M_n$ ca. 140,000 and Tg=94° C.).

The thermolytic precursor used, cobalt dodecanthiolate $[Co(SC_{12}H_{25})_2]$, was mixed with the polymer through a solution in an amount equal to 10% by weight with respect to the total weight of polymer and precursor, obtaining a homogeneous dispersion of polymer and precursor.

In particular, the aPS was dissolved in a chloroform solution at a concentration equal to 20% by weight with respect to the total weight. Similarly, the cobalt dodecanthiolate was dissolved always in chloroform at a concentration equal to 40% by weight with respect to the total weight.

The two solutions were mixed for some minutes on a plate with magnetic agitator and subsequently the entire solution was cast in Petri dishes leaving the solvent evaporate. Once dried the material was reduced into pellets.

Thus, the pellets of polymer comprising the precursor uniformly dispersed therein were heated in a Haak Rheocord 9000 mixer, at a temperature of about 160° C. for approximately 30 minutes.

Example 3

Figure 4:
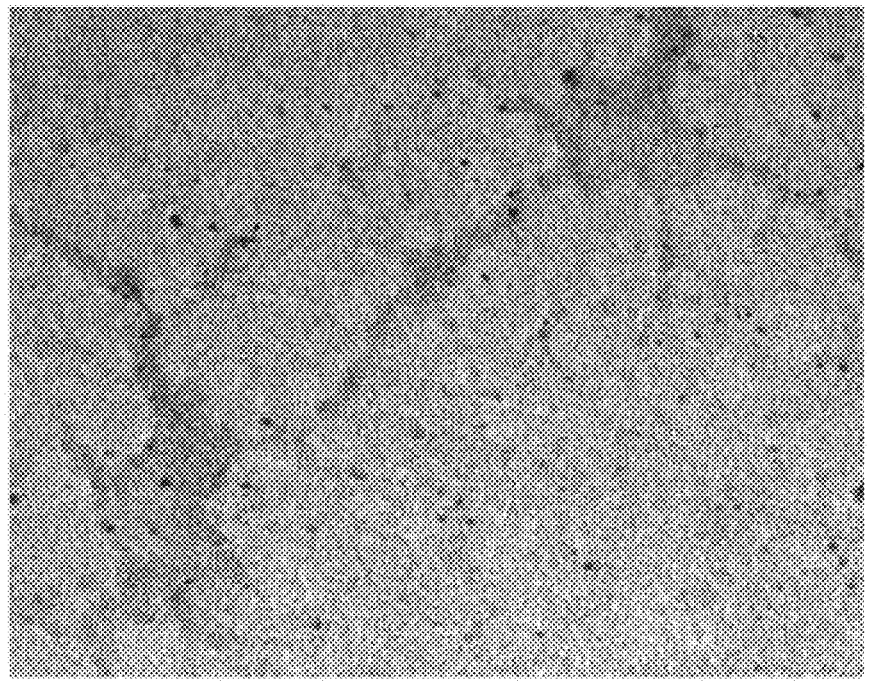
FIG. 4 shows an electronic transmission micrography of a further sample of polystyrene comprising cobalt inclusions obtained through a further embodiment of the process according to the invention.

FIG. 4 shows an electronic transmission micrography of a polystyrene sample comprising cobalt monodispersed nanoparticles with mean diameter of about 20 nm.

The heated homogeneous dispersion, identical to the one of the example 2, was obtained by dispersing the precursor in the molten polymer directly during the heating step inside the mixer.

The present invention is based, in practice, on having realized a process "in situ" wherein the nanometric inclusions are obtained by the precursor dispersed directly in the molten polymer.

According to the invention, it is necessary to have an intimate and uniform mixing between polymer and precursor, which can be obtained for example by thermomixing or dispersion through a solution, for then obtaining the fission of the precursor directly in the molten polymer.

The polymeric material comprising the uniformly dispersed nanometric inclusions can be thus stocked, for example in the form of pellets, granules, spheroids, powders and similar semi-finished products, for being then and separately heat-processed, or it can be thermoformed, i.e., heat-shaped, at the end of the process according to the invention, obtaining a relative manufactured or formed article.

The formation of inclusions directly in a molten polymeric matrix has the great advantage of making the process according to the invention usable for realizing manufactures in nanocomposite polymeric material on a large scale.

Other important advantages are achieved by means of the process according to the invention. For example, with the present process it is possible to use the conventional machinery for thermoforming polymers since the heat used for attaining the softening of the polymer is used also for the thermolytic fission of the precursor in the molten polymeric matrix.

Another advantage is that the metallic mercaptides are compounds practically inert at ambient temperature, which can be prepared without difficulty and stocked for a prolonged time without having to resort to controlled atmospheres, and it is possible, moreover, to prepare mercaptides of any metal and also polymetals. Such precursors are not toxic and they can be used in the process according to the invention also powdered.

Another advantage stays in the organic nature of the precursors used, which makes an efficient mixing thereof with the polymer possible since the aggregation phenomena of the inclusions are minimized. This favors a uniform dispersion of the same inclusions in the polymeric matrix conveniently allowing the use of any polymer which can be heat-shaped, even the use of non-polar polymers otherwise difficult to be employed.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

A technician of the field will be allowed to bring several modifications to the above described process according to the invention and to its shown embodiments, so as to meet contingent and specific needs, all within the scope of protection of the invention, as defined by the hereafter reported claims.

The invention claimed is:

1. A process for the preparation of a composite polymeric material containing nanometric inorganic inclusions comprising:
    mixing a polymer and a thermolytic precursor to provide a homogeneous dispersion of said precursor and said polymer; and
    heating said homogeneous dispersion to provide a molten polymer and thermolytic fission of said precursor to form the nanometric inorganic inclusions dispersed in the molten polymer, wherein said mixing and said heating occur simultaneously in a single thermomixing and fission step, and wherein said thermomixing and fission step comprises a first heating and mixing stage at a first temperature lower than the fission temperature of the thermolytic precursor and a second heating and fission stage at a second temperature equal or higher than the fission temperature of the thermolytic precursor.

2. The process according to claim 1, wherein said mixing includes dispersing said thermolytic precursor through a solution in said polymer to provide said homogeneous dispersion.

3. The process according to claim 1, wherein said composite polymeric material is a formed article and the process further comprises subjecting said molten polymer comprising said inclusions to thermoforming.

4. The process according to claim 3, wherein said heating and said thermoforming occur simultaneously.

5. The process according to claim 3, wherein said thermoforming is an extrusion step.

6. The process according to claim 3, wherein said thermoforming is an injection molding step.

7. The process according to claim 3, wherein said thermoforming is a calendering step.

8. The process according to claim 3, wherein said thermoforming is a compression molding step.

9. The process according to claim 3, wherein said thermoforming is a roto-molding step.

10. The process according to claim 3, wherein said thermoforming is a powder injection molding step.

11. The process according to claim 3, wherein said thermoforming includes a molding step with thixotropic forming.

12. The process according to claim 3, wherein said thermoforming is a spinning step.

13. The process according to claim 1, wherein said thermolytic precursor is a metallic mercaptide.

14. The process according to claim 13, wherein said metallic mercaptide is a mercaptide of gold, silver, copper, palladium, cobalt, platinum, nickel, cadmium, zinc, iron, rhodium, iridium, ruthenium, or osmium or a mixture thereof.

15. The process according to claim 14, wherein said metallic mercaptide comprises an organic residue.

16. The process according to claim 15 wherein the organic residue is an aliphatic, substituted aliphatic, arylic, substituted arylic, arylalkylic, substituted arylalkylic, alkylarylic residue or substituted alkylarylic residue.

17. The process according to claim 15, wherein said organic residue is an alkylic residue of general formula $C_mH_{2m+1}$, where m is an integer between 4 and 100, inclusive.

18. The process according to claim 16, wherein said organic residue is sulphur resinate, o-methyl phenyl, m-methyl phenyl, p-methyl phenyl, phenyl, p-ter-butyl phenyl, o-methyl-p-ter-butyl phenyl, pinenyl, isopropyl, sec-butyl, 1-methylheptyl, 1-methyldodecyl, 1-methyloctadodecyl, α-methyl benzyl, α-butyl benzyl, α-undecyl benzyl, tert-dodecyl, tert-amyl, tert-octyl or tert-butyl.

19. The process according to claim 17 wherein m is an integer between 6 and 20 inclusive.

20. The process according to claim 1, wherein said thermolytic precursor is a powdered precursor.

21. The process according to claim 1, wherein said polymer is in a granular form or powdered.

22. The process according to claim 1, wherein said polymer is a thermoformable polymer chosen in the group consisting of polyolefins, rubbers, polystyrenes, polyacrylates, polyacrylics, polyamides, polycarbonates, polychlorinates, saturated and unsaturated polyesters, polyethers, polyfluorinated, polyketones, polyoxides, polymethacrylates, polymers containing sulphides, vinyl polymers, thermoplastic polyurethanes, polyimides, polyarylates, polyaldehydes, cellulose, mixtures and copolymers thereof.

23. The process according to claim 22, wherein said polymer is in an expanded form.

24. The process according to claim 22, wherein said polymer has regular taxis.

25. The process according to claim 22, wherein said polyolefins are chosen from the group consisting of polyethylene with low, medium and high density, polyethylene with high and ultra high molecular weight, linear polyethylene, cross-linked polyethylene, polyisobutylene, polymethylpentene, polypropylene, polybutene.

26. The process according to claim 22, wherein said rubbers are polyisoprene, polybutadiene, polychloroprene, poly(ethylene-co-propylene), or poly(butadiene acrylonitrile).

27. The process according to claim 22, wherein said polystyrenes are polystyrene, poly(styrene-co-butadiene), poly(styrene-co-acrylonitrile), poly(styrene-co-maleic anhydride), poly(acrylonitrile-butadiene-styrene), poly(acrylonitrile-ethylene chloride-styrene), poly(acrylonitrile-ethylenepropilendiene-styrene), poly(acrylonitrile-styrene-acrylate) or poly(styrene-co-methyl methacrylate).

28. The process according to claim 22, wherein said polyarylates are polyacrylate, poly(acrylonitrile-butadiene-acrylate), poly(n-butyl acrylate), polyisopropylacrylate, polyethylacrylate, or polymethylacrylate.

29. The process according to claim 22, wherein said polyacrylic are polyacrylonitrile, poly(acrylonitrile-methyl-methacrylate) or polyacryl ether ketone.

30. The process according to claim 22, wherein said polyamides are polyamide 6, polyamide 11, polyamide 12, polyamide 46, polyamide 66, polyamide 68, polyamide 69, polyamide 610, polyamide 612, poly(m-phenylene isophthalamide), polyphthalamide, poly(1,4-phenyldiamine), polyacrylamide, polyarylamide or polyamidimide.

31. The process according to claim 22, wherein said polychlorinates are polyvinylchloride, chlorinated polyvinylchloride, polyvinylidenechloride, chlorinated polyethylene, chlorinated polypropylene or polychlorotrifluorethylene.

32. The process according to claim 22, wherein said polyesters are polybutyleneterephthalate, polyethylenephthalate, polycyclic exandimethylene terephthalate, polyethyleneisophthalate or polyethyleneterephthalate.

33. The process according to claim 22, wherein said polyethers are polyetherimide, polyether ketone, polyoxymethylene, polyphenylenoxide or polyphenylether.

34. The process according to claim 22, wherein said polyfluorinated are polyvinyl fluoride or polyvinylidene fluoride.

35. The process according to claim 22, wherein said polymer is polyether ketone.

36. The process according to claim 22, wherein said polyoxides are ethylene polyoxide or propylene polyoxide.

37. The process according to claim 22, wherein said polymethacrylates are polybenzyl methacrylates, polybutyl methacrylate, polycyclic exyl methacrylate, polyethyl methacrylate, polyisobutyl methacrylate, polyisopropyl methacrylate, polymethyl methacrylate, polyphenyl methacrylate or poly(n-propyl methacrylate).

38. The process according to claim 22, wherein said polymers containing sulphides are polysulphone, polyphenylenesulfur, or polyether sulphone.

39. The process according to claim 22, wherein said vinyl polymers are polyvinyl acetate, polyvinyl butyryl, polyvinyl alcohol, polyvinyl chloride acetate, polyvinylidenacetate or polyvinyl carbazole.

40. The process according to claim 22, wherein said polymer is a phenol formaldehyde resin.

41. The process according to claim 1, wherein said thermolytic precursor is mixed with said polymer in an amount between about 0.1% and 60% by weight with respect to the total weight of the thermolytic precursor and the polymer used.

42. The process according to claim 41, wherein said thermolytic precursor is mixed with said polymer in an amount between about 1% and 20% by weight with respect to the total weight of the thermolytic precursor and the polymer.

43. A process of preparing a composite polymeric material comprising:
  providing a homogeneous dispersion by mixing a polymer and a metallic precursor; and
  decomposing the metallic precursor to an element metal by heating the homogeneous dispersion, wherein said mixing and said heating occur simultaneously in a single thermomixing and fission step, and wherein said thermomixing and fission step comprises a first heating and mixing stage at a first temperature lower than the fission temperature of the thermolytic precursor and a second heating and fission stage at a second temperature equal or higher than the fission temperature of the thermolytic precursor.

44. The process of claim 43 wherein the mixing step including mixing the polymer in a first solvent with the metallic precursor in a second solvent.

45. The process of claim 44 wherein the first solvent and the second solvent are the same.

46. The process of claim 43 wherein the heating step includes:
  a first step of melting the polymer without decomposing the metallic precursor; and
  a second step of decomposing the metallic precursor to the element metal.

47. The process of claim 43 wherein the metallic precursor is a metallic mercaptide of formula Me(SR)n, wherein:
  Me is gold, silver, copper, palladium, cobalt, platinum, nickel, cadmium, zinc, iron, rhodium, iridium, ruthenium or osmium;
  R is an organic residue; and
  n is 1, 2, 3 or 4.

48. The process of claim 47 wherein R is an aliphatic, substituted aliphatic, aryl, substituted aryl, arylalkyl, substituted arylalkyl, alkylaryl residue or substituted alkylaryl.

49. The process of claim 48 wherein R is represented by formula $C_mH_{2m+1}$, wherein m is an integer between 4 and 100, inclusive.

50. The process of claim 43 wherein the metal precursor is present in the homogeneous dispersion at a concentration of about 0.1 to about 60% by weight.

51. The process of claim 43 wherein the metal precursor is present in the homogeneous dispersion at a concentration of about 1 to about 20% by weight.

52. The process of claim 43 further comprising thermoforming the composite polymeric material having the element metal dispersed in the polymer.

53. The process of claim 52 wherein the mixing, the heating and the thermoforming take place concurrently.

54. A process for the preparation of a composite polymeric material containing nanometric inorganic inclusions comprising:

mixing a polymer and a thermolytic precursor to provide a homogeneous dispersion of said precursor and said polymer;

heating said homogeneous dispersion to provide a molten polymer and thermolytic fission of said precursor to form the nanometric inorganic inclusions dispersed in the molten polymer, wherein said composite polymeric material is a formed article; and subjecting said molten polymer comprising said inclusions to thermoforming, wherein said thermoforming includes a calendering step, a roto-molding step, or a spinning step.

55. The process according to claim 54, wherein said thermolytic precursor is a metallic mercaptide.

56. The process according to claim 55, wherein said metallic mercaptide is mercaptides of gold, silver, copper, palladium, cobalt, platinum, nickel, cadmium, zinc, iron, rhodium, iridium, ruthenium, osmium or mixtures thereof.

* * * * *